(12) United States Patent
Singh et al.

(10) Patent No.: US 11,487,753 B1
(45) Date of Patent: Nov. 1, 2022

(54) OPTIMIZING TRANSACTION TIMES IN DISTRIBUTED DATABASES

(71) Applicant: salesforce.com, inc., San Francisco, CA (US)

(72) Inventors: Prabhjot Singh, Union City, CA (US); Kalyan Chakravarthy Thatikonda, Dublin, CA (US); Niyati Omprakash Verma, Milpitas, CA (US); Sathyavelrajan Avudaiappan, Moraga, CA (US)

(73) Assignee: Salesforce, Inc., San Francisco, CA (US)

( * ) Notice: Subject to any disclaimer, the term of this patent is extended or adjusted under 35 U.S.C. 154(b) by 9 days.

(21) Appl. No.: 17/306,560

(22) Filed: May 3, 2021

(51) Int. Cl.
G06F 16/00 (2019.01)
G06F 16/242 (2019.01)
G06F 16/23 (2019.01)
G06F 16/2455 (2019.01)

(52) U.S. Cl.
CPC ...... *G06F 16/2448* (2019.01); *G06F 16/2358* (2019.01); *G06F 16/2379* (2019.01); *G06F 16/24565* (2019.01)

(58) Field of Classification Search
CPC ............. G06F 16/2448; G06F 16/2358; G06F 16/2379; G06F 16/24565
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

OTHER PUBLICATIONS

Brian Bickell. "SQL Server User Defined Function Synchronization: The "yo dawg" method.". (Year: 2009).*

*Primary Examiner* — Syed H Hasan (74) *Attorney, Agent, or Firm* — Dergosits & Noah LLP; Todd A. Noah (57) ABSTRACT

Optimizing transaction times for distributed databases is described. A system receives a request which specifies an identifier of a database record associated with a distributed database. If the request is associated with a primary database of the distributed database, any user-defined function is associated with the database record in the primary database, and any associated user-defined function does not require any call that is external to a subnet and/or a firewall associated with the primary database, then the system executes, within the subnet and/or the firewall associated with the primary database, each associated user-defined function for the database record in the primary database. The system outputs a result which is based on executing any associated user-defined functions.

20 Claims, 4 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0132607 A1* | 5/2009 | Danesi ............. G06F 16/2358 |
| 2009/0177744 A1 | 7/2009 | Marlow et al. |
| 2012/0233137 A1 | 9/2012 | Jakobson et al. |
| 2012/0317447 A1* | 12/2012 | Yildiz ............. G06F 11/0784 |
| | | 714/48 |
| 2013/0166766 A1* | 6/2013 | Nahrstedt ......... H04N 21/2393 |
| | | 709/231 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2018/0034714 A1* | 2/2018 | Zhang ................ H04L 67/12 |
| 2018/0081924 A1* | 3/2018 | Johnston ........... G06F 16/278 |

* cited by examiner

OPTIMIZING TRANSACTION TIMES IN DISTRIBUTED DATABASES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database management system may distribute a database over a network of interconnected computers. Database replication may be used by a distributed database management system, usually with a primary-secondary relationship between an original database and the replicas of the database. The replication process ensures that a distributed database remains up-to-date and current by identifying changes in the primary database, which processes the system's write requests, and propagating the changes to the secondary replicas of the database, which process the system's read requests.

Some distributed database systems improve their performance by increasing their available memory, scaling horizontally, and using database triggers to perform time-critical operations. A trigger can be procedural code that is automatically executed in response to certain detected events in a database, such as in response to user interactions with a database. For example, a trigger may be code that is executed before or after the execution of various types of detected database operations, such as create, update, delete, etc. A trigger may be used to perform a number of automatic actions, such as cascading changes through related tables, enforcing column restrictions, comparing the results of data manipulations, and maintaining the referential integrity of data across a database. For example, when a new record which represents a new employee is added to a table that stores personal information for current employees, a distributed database system automatically executes a trigger which creates new records for the new employee in other tables for employee-related accounting, such as taxes, vacations, and salaries.

While triggers can perform some automatic actions, triggers are limited in their functionality, are not language agnostic, cannot interact with application programming interfaces (APIs), and cannot have complex logic for integrating with and gathering data from other systems, such as a distributed database system's cache or the Solr open-source enterprise search platform. Some distributed database systems that need integration with a third-party application can use an orchestration layer which provides the connections and/or instructions between the distributed database system's connectors and a third-party application's connectors. Such an orchestration layer can manage data formatting between separate services, and also manage when requests and responses need to be split, merged, or routed. This orchestration layer can provide a distributed database system's API with a level of intelligence for communication between services, while handling vital authentication tasks.

If such a complex orchestration layer is written in the structured query (SQL) language, then this orchestration layer would be so bulky that it will not be manageable or testable. While such an orchestration layer may be efficiently written in the Java layer in the business logic layer, a consequence of using such an orchestration layer is that the mechanism to monitor a distributed database system would be a pull mechanism, which means that a Java layer business application polls the distributed database system to determine if there are any changes in the distributed database. However, even if a Java layer business application polls every 1 second, that is 1 second which has been lost waiting for database changes and 1 second of the distributed database system's time which could have been optimized. A delay of 1 second between the occurrence of a database transaction and the initiation of a response to the database transaction could be critical in certain scenarios, such as responding to a stock price alert by either buying or selling significant amounts of stock within a narrow time window.

A distributed database system can avoid such a potential delay in processing database changes by leveraging a messaging queue system in which an event and/or a message is written with a database record's identifier. The listener for this event and/or message then fetches the updated information from the distributed database system by using the database record's identifier to perform the required process. However, leveraging a messaging queue system requires the distributed database and messaging queue systems to work in conjunction and needs replication of both the distributed database and the messaging queue systems. For example, if any data is updated in the distributed database system's primary database, the same data must be also updated in the messaging queue system.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

A highly performant distributed database system can use a lightweight orchestration layer powered by user-defined functions which operate on create, read, update, and delete (CRUD) operations to optimize transaction speeds. Since create, update, and delete operations result in writing to the primary database of a distributed database, the create, update, and delete operations may be referred to as transactions, while read operations which result in reading from a secondary database of a distributed database are not generally referred to as transactions. Optimizing transaction speed could be essential for time-critical transactions in a distributed database, which can occur in a public cloud and/or a private network configuration.

In accordance with embodiments described herein, there are provided systems and methods for optimizing transaction times in distributed databases. A system receives a request which specifies an identifier of a database record associated with a distributed database. If the request is associated with a primary database of the distributed database, any user-defined function is associated with the database record in the primary database, and any associated user-defined function does not require any call that is external to a subnet and/or a firewall associated with the primary database, then the system executes, within the subnet and/or the firewall associated with the primary database, each associated user-defined function for the database record in the primary database. The system outputs a result which is based on executing any associated user-defined functions.

For example, a distributed database system includes the primary database's host machine, which receives a request to write the new price of $99.99 for each share of Acme Corporation stock, and then the primary database's SQL layer determines that the request is a write request to be executed on the distributed database's primary database. This SQL layer identifies a user-defined function for comparing the new price of stock shares, including Acme Corporation stock shares, to the prices of stock shares specified by customers' buy limit orders and a user-defined function that conditionally purchases stock shares, including Acme Corporation stock shares, if the new price of the stock shares is below the differing prices of stock shares specified by different customers' buy limit orders. Within the subnet and firewall for the primary database's host machine, this SQL layer invokes an orchestration layer which executes the user-defined function that compares the new price of stock shares, including Acme Corporation stock shares, to the differing prices of stock shares specified by different customers' buy limit orders. This orchestration layer also executes the user-defined function which calls externally to the subnet and firewall for the primary database's host machine to a third-party to purchase large amounts of Acme Corporation stock shares because the new price of Acme Corporation stock shares is below many of the prices of Acme Corporation stock shares specified by many customers' buy limit orders. The distributed database system outputs purchase notifications to many of the customers based on their purchases of Acme Corporation stock shares due to their buy limit orders.

Systems and methods are provided for optimizing transaction times in distributed databases. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. The following detailed description will first describe a system for optimizing transaction times in distributed databases. Next, a method for optimizing transaction times in distributed databases will be described with reference to example embodiments.

While one or more implementations and techniques are described with reference to an embodiment in which optimizing transaction times in distributed databases are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Figure 1:
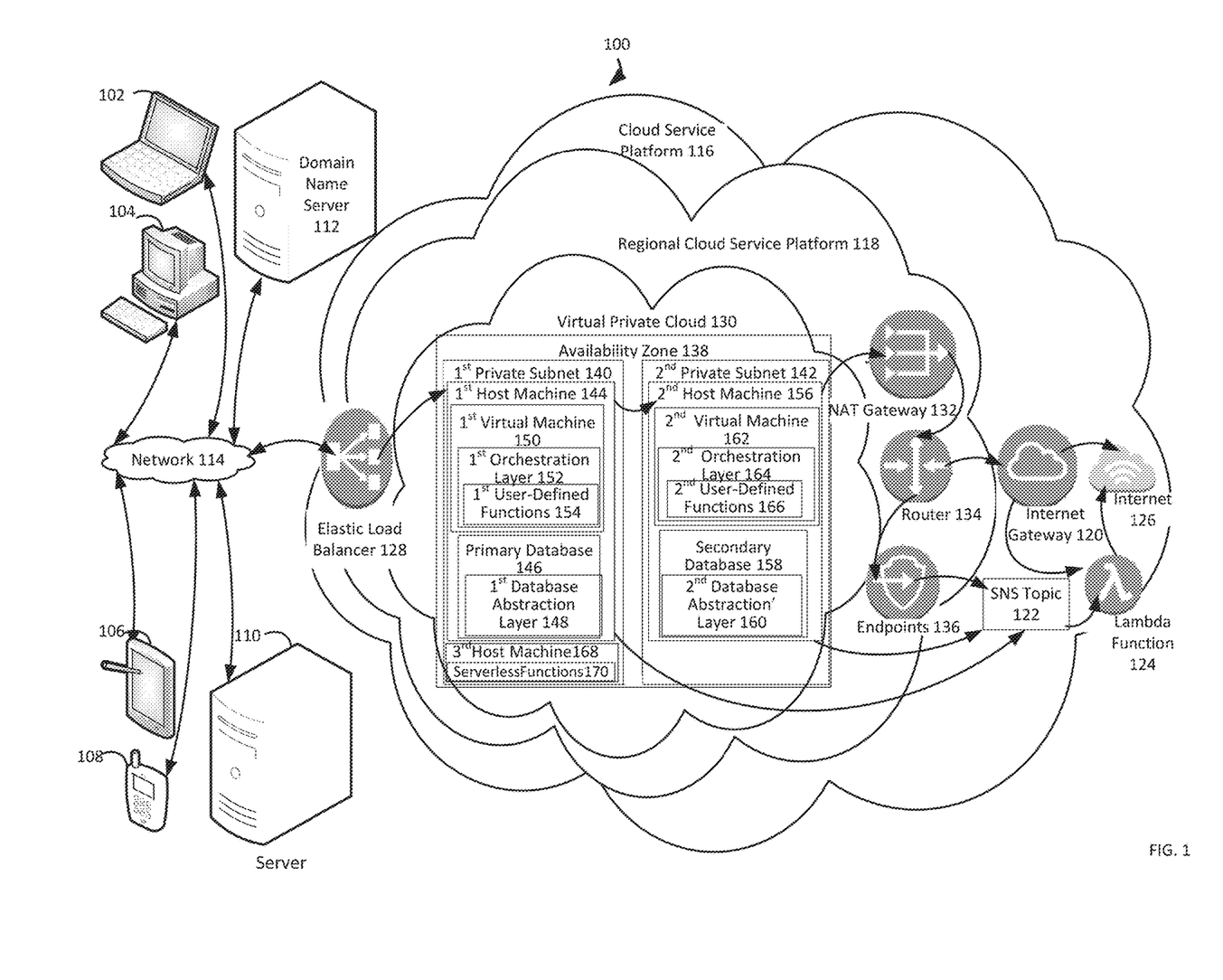
FIG. 1 is a block diagram of a high-level overview of a system for optimizing transaction times in distributed databases, in an embodiment.

FIG. 1 illustrates a block diagram of a system that optimizes transaction times in distributed databases, under an embodiment. As shown in FIG. 1, system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, a third client 106; a fourth client 108; a fifth client 110, and a domain name server 112. The first client 102 may be a laptop computer 102, the second client 104 may be a desktop computer 104, the third client 106 may be a tablet computer 106, the fourth client 108 may be a smart phone 108, and the fifth client 110 may be a server 110. The clients 102-110 and the domain name server 112 communicate via a network 114.

The system 100 may include a cloud service platform 116, which may include a regional cloud service platform 118, an internet gateway 120, a Simple Notification Service (SNS) topic 122, a lambda function 124, and an internet connection 126. The regional cloud service platform 118 may include an elastic load balancer 128, a virtual private cloud 130, a Network Address Translation (NAT) gateway 132, a router 134, and a set of endpoints 136. The virtual private cloud 130 may include an availability zone 138, which may include a first database private subnet 140 and a second database private subnet 142.

FIG. 1 depicts the system 100 with five clients 102-110, one domain name server 112, one network 114, one cloud service platform 116, one regional cloud service platform 118, one internet gateway 120, one SNS topic 122, one lambda function 124, one internet connection 126, one elastic load balancer 128, one virtual private cloud 130, one NAT gateway 132, one router 134, one set of endpoints 136, one availability zone 138, and two database private subnets 140-142. However, the system 100 may include any number of each of the clients 102-110, the domain name server 112, the network 114, the cloud service platform 116, the regional cloud service platform 118, the internet gateway 120, the SNS topic 122, the lambda function 124, the internet connection 126, the elastic load balancer 128, the virtual private cloud 130, the NAT gateway 132, the router 134, the set of endpoints 136, the availability zone 138, and the database private subnets 140-142.

Cloud services may be accessed through a co-located cloud computer service, a web service application programming interface (API), or by applications that utilize a web service API, such as cloud desktop application, a cloud gateway application, or Web-based content management systems. A cloud gateway application exposes an interface backed by a service offered by a cloud platform. Any request sent to the interface exposed by the cloud gateway application ends up being sent to a service offered by the cloud platform. The cloud gateway application can use cloud service application programming interfaces, such as Simple Object Access Protocol (SOAP) and Representational State Transfer (REST). The cloud service gateway application can serve as an intermediary to multiple cloud service platforms, such as a Google® cloud service platform, an Amazon Web Services® cloud service platform, and/or a Microsoft® Azure cloud service platform.

The first database private subnet 140 may include a first host machine 144, which may include a primary database 146, which may include a first database abstraction layer 148, which may be referred to as the first SQL layer 148. The first host machine 144 may include a first virtual machine 150, which may include a first orchestration layer 152, which may include a first set of user-defined functions 154. The second database private subnet 142 may include a second host machine 156, which may include a secondary database 158, which may include a second database abstraction layer 160, which may be referred to as the second SQL layer 160. The second database private subnet 142 may include a second virtual machine 162, which may include a second orchestration layer 164, which may include a second set of user-defined functions 166. The first database private subnet 140 may additionally include a third host machine 168, which may include a set of serverless functions 170. A host machine can be a computer that mediates multiple access to a database mounted on the computer and/or provides another service to a computer network. A virtual machine can be a software implementation of a computer that executes programs like a physical computer.

The primary database resides on a host machine, and a user-defined function can reside on the same host machine as the primary database, can reside on another host machine in the same subnet as the primary database, and/or can be executed by a virtual machine that resides on the same host machine as the primary database. For example, the primary database 146 resides on the first host machine 144 in the first database private subnet 140, while the first set of user-defined functions 154 resides on the same first host machine 144 and is executed by the first virtual machine 150 that resides on the same first host machine 144, and the third set of user-defined functions resides on the third host machine 168 in the same first database private subnet 140.

FIG. 1 depicts the system 100 with three host machines 144, 158, and 168, one primary database 146, one secondary database 156, two database abstraction layers 148 and 160, two virtual machines 150 and 162, two orchestration layers 152 and 164, two sets of user-defined functions 154 and 166, and one set of serverless functions 170. However, the system 100 may include any number of each of the host machines 144, 158, and 168, the primary database 146, the secondary database 156, the database abstraction layers 148 and 160, the virtual machines 150 and 162, the orchestration layers 152 and 164, the sets of user-defined functions 154 and 166, and the set of serverless functions 170.

The total memory of a database instance and the corresponding set of the user-defined functions may be used to design a distributed database system's architecture. The most lightweight business-critical user-defined functions reside on a database instance's host machine and provide more functionality than triggers could provide. For example, the first host machine 144 has 64 gigabytes (GB) of memory and can perform very effectively when executing the primary database 146 which requires 48 GB of heap (an area of memory for dynamic memory allocation) and the first set of user-defined functions 152 which requires 4 GB of memory. For secure distributed database systems which do not permit data to leave a database instance's host machine, the user-defined functions reside on the same host machine.

The set of user-defined functions that reside on a database instance's host machine operate in their own virtual machine, such as a Java Virtual Machine (JVM) for user-defined functions written in the Java programming language, such that the execution of these user-defined functions does not impact the functionality and performance of the database instance which resides on the same host machine. When a virtual machine executes a set of user-defined functions residing on a database instance's host machine, the execution of the user-defined functions which do not require an external call can eliminate the time waiting for a network packet of data to resolve a domain name server, the time to cross any subnet boundaries, and the time to pass any firewalls. When a host machine executes the user-defined functions on the same subnet as a database instance's host machine, the execution of the user-defined functions which do not require an external call can eliminate the time waiting for a network packet of data to cross any subnet boundaries and the time to pass any firewalls.

Although executing the user-defined functions on the same subnet as a database instance's host machine does not eliminate the time waiting for a network packet of data to resolve a domain name server, the distributed database system's push model still provides significant optimizations over a pull model that polls for updates. However, after a distributed database system's architecture has been determined, the addresses of host machines in the same subnet can be stored in locally accessible files. For example, since the first host machine 144 and the third host machine 168 both reside in the first database private subnet 140, these host machines 144 and 168 each have a locally accessible file that stores the address of the other host machine, such that neither host machine needs to call a domain name server to determine the other host machine's address. Consequently, when a host machine executes the user-defined functions on the same subnet as a database instance's host machine, the time required to determine another host machine's address from such a locally accessible file may be significantly less than the time waiting for a network packet of data to resolve a domain name server. Even when some user-defined functions are required to make calls that are external to the subnet and firewall of a database instance's host machine, and therefore require waiting for the time for network packets to resolve domain name servers, the time to cross any subnet boundaries, and the time to pass any firewalls, the distributed database system's push model still provides significant optimizations over a pull model that polls for updates.

User-defined functions that require high processing power reside on host machines that are within the same subnet and the same firewalls as the database instance's host machine, thereby providing the flexibility for horizontal scaling without any impact on the distributed database. Instead of performing any requested heavy business tasks, an orchestration layer routes such an incoming request based upon the API responses. The heavy business functions are performed in serverless APIs and functions that are deployed in the same subnet as a database instance's host machine, but on a separate host machine. For example, the serverless functions 170 are executed by the third host machine 168 that resides within the same first database private subnet 140 where the primary database 146 is hosted by the first host machine 144, which can leverage the serverless functions 170. Serverless computing is a cloud computing execution model in which the cloud provider allocates machine resources on demand, taking care of the servers on behalf of their customers.

User-defined functions are language agnostic and can be written in, and therefore easily interact with, common languages like Java and Python. User-defined functions may be extended by servers and serverless APIs and functions. The overhead needed for operational maintenance may be reduced by user-defined functions calling serverless APIs and functions.

The distributed database system determines whether each user-defined function resides on the same host machine as a database instance, a different host machine in the same subnet as the host machine for a database instance, or in a different subnet than the host machine for a database instance, based upon the priority of the user-defined function, the size of a virtual machine in a host machine, and the data classification of the database record(s) that enables the user-defined function. The distributed database system differentiates between the use cases of writing criticality and reading criticality for incoming requests. The business logics that need to operate and write back to a distributed database are performed by user-defined functions on the primary database.

For complex business logics, user-defined functions can interact with third-party systems by extracting data from the third-party systems, performing the required operation, and then writing the required operation's results to the primary database. Business logics that are non-critical read-only operations are performed by user-defined functions on the secondary databases. Since replicating between the primary database and the secondary databases can require a relatively long time, such as approximately 100 milliseconds, the distributed database system uses the secondary databases only for non-critical use cases.

The distributed database system receives requests which identify database records. For example, the first host machine 144 receives a request from the server 110 to write new prices for thousands of corporations' shares of stock, which include the new price of $99.99 for each share of Acme Corporation stock. In another example, the first host machine 144 receives a customer's request from the laptop computer 102 to view the customer's stock share prices.

A request can be an instruction to a computer to provide information or perform another function. An identifier can be a sequence of characters used to refer to an element, such as a variable or a set of data, in a computer. A database record can be a structured set of related items of information that are handled as a unit by a computer. A distributed database can be an organized collection of information that is dispersed over a network of interconnected computers, such as a cloud service platform. The first host machine 144 may subscribe to receive stock share prices from the server 110, which sends the new stock share prices over the network 112 to the cloud service platform 116, which uses the elastic load balancer 128 in the regional cloud service platform 118 to forward the new stock share prices to the first host machine 144 in the first private subnet 140 in the availability zone 138 in the virtual private cloud 130 in the regional cloud service platform 118.

After receiving requests, the distributed database system determines whether each received request is to be executed on the primary database or a secondary database. For example, the first SQL layer 148 in the primary database 146 in the host machine 144 determines that the request to write the new price of $99.99 for each share of Acme Corporation stock is a write request which is to be executed on the distributed database system's primary database 146. A primary database can be an organized collection of information which is a source of information that is replicated, For each request to be executed on the primary database, the distributed database system determines whether any user-defined function is enabled for the request and the requested database record(s). For example, the first SQL layer 148 determines that the first set of user-defined functions 152 includes a user-defined function for comparing the new prices of stock shares, including Acme Corporation stock shares, to the differing prices of stock shares specified by different customers' buy limit orders. In another example, the first SQL layer 148 also determines that the first set of user-defined functions 152 also includes a user-defined function that conditionally purchases stock shares, including Acme Corporation stock shares, if a stock share's new price is below the stock share's price specified by customers' buy limit orders. A user-defined function can be a subroutine or a sequence of instructions, within a larger computer program, which is created by a person who operates a computer. Although any user could create a user-defined functions, a system administrator may limit access to such creation rights to only the users whom the system administrator has approved as capable of creating software which is likely to execute properly, such as a database administrator.

For each user-defined function which is enabled for a request and the primary database record(s) identified by the request, the distributed database system determines whether such a user-defined function requires any external call beyond the subnet and firewall of the primary database's host machine. For example, the first SQL layer 148 invokes the first orchestration layer 152 which determines that the user-defined function for comparing the new prices of stock shares, including Acme Corporation stock shares, to the differing prices of stock shares specified by different customers' buy limit orders is to be executed within the subnet and firewall for the first host machine 144 that hosts the primary database 146. In another example, the first SQL layer 148 invokes the first orchestration layer 152 which determines that the user-defined function that conditionally purchases stock shares, including Acme Corporation stock shares, if a stock share's new price is below the differing prices of stock shares specified by different customers' buy limit orders is to be executed by calling externally to the subnet and firewall for the first host machine 144 that hosts the primary database 146.

A call can be a mechanism used by an application program to request service from an operating system or another application program. A subnet can be a logical separation of an internet protocol network. A firewall can be a network security system that monitors and controls incoming and outgoing network traffic based on predetermined security rules.

Following the identification of internally executing user-defined functions, the distributed database system executes each user-defined function for primary database records which can be executed internally within the subnet and firewall for the primary database's host machine. For example, the first orchestration layer 152 executes the user-defined function, within the subnet and firewall for the first host machine 144 that hosts the primary database 146, to compare the new prices of stock shares, including Acme Corporation stock shares, to the differing prices of stock shares specified by different customers' buy limit orders.

In addition to internal executions, the distributed database system executes each user-defined function for primary database records which requires calling externally to the subnet and firewall for the primary database's host machine. For example, the first orchestration layer 152 executes the user defined function that calls externally to the subnet and firewall for the first host machine 144 that hosts the primary database 146 to a third-party to purchase large amounts of Acme Corporation stock shares because the new price for Acme Corporation stock shares is below many of the prices specified for Acme Corporation stock shares by many customers' buy limit orders.

In addition to identifying user-defined functions which are enabled, the distributed database system can determine whether any triggers are enabled for a request and the requested primary database record(s). For example, the first SQL layer 148 determines whether any triggers are associated with a primary database record identified by a request.

Once identified as enabled, the distributed database system executes any triggers which are enabled for primary database records identified by a request. For example, the first SQL layer 148 executes a trigger that combines a customer's most recent purchases and sales of stock shares, including the purchase of Acme Corporation stock shares based on the customer's buy limit order, into a notification, and provides the notification to the output queue of the first host machine 144. Since a customer may have a large number of stock shares sales and purchases in response to the first host machine 144 receiving the new prices for thousands of corporations' stock shares, the customer may prefer to receive a single notification which includes descriptions of each sale and purchase, rather than receiving a large number of notifications which each describe a single sale or purchase.

The post-transaction read-only user-defined functions reside on the cluster of secondary databases. The distributed database system determines whether any user-defined function is enabled for a request and any requested secondary database records. For example, the second SQL layer 160 responds to a customer's request to view their stock share prices by identifying a user-defined function for reading the new share prices of each stock in the customer's portfolio from the secondary database 158, including the new share prices for Acme Corporation stock. A secondary database can be an organized collection of information which is a destination of information that is replicated.

After being identified as enabled, the distributed database system executes each user-defined function that is enabled for secondary database records. For example, the second virtual machine SQL layer 162 invokes the second orchestration layer 164 which executes the user-defined function that reads the new share prices of each stock in a customer's portfolio from the secondary database 158, including the new share prices for Acme Corporation stock, and sends the compilation of share prices for each listed stock to the output queue for the second host machine 156. When executing any user-defined function for secondary database records, the distributed database system can execute a user-defined function internally or externally to the subnet and firewall for the secondary database's host machine. For example, when the second orchestration layer 164 executes the user-defined function which reads the new share prices of each stock in the customer's portfolio from the secondary database 158, the user-defined function is being executing within the subnet and the firewall for the second host machine 156 that hosts the secondary database 158. In another example, the user-defined function may supplement the new share prices of each stock in a customer's portfolio with share price projections from a different database by calling externally to the subnet and/or the firewall for the second host machine 156 that hosts the secondary database 158.

Following the executions, the distributed database system outputs a result which is based on executing any user-defined functions and/or triggers. For example, the first host machine 144 outputs purchase notifications to many of the customers based on the purchases of large amounts of Acme Corporation stock shares corresponding to many of the customers' buy limit orders. A result can be a consequence, effect, or outcome of something.

The first host machine 144 may send notifications to the Simple Notification Service (SNS) topic 122, which is a logical access point that acts as a communication channel, and which groups multiple endpoints (such as the Lambda function 124 and the endpoints 136). An endpoint can be the entry point to a service, a process, a queue, or a topic destination in service-oriented architecture. The SNS topic 122 forwards the notification to the lambda function 124, which is a computer service that runs code only when needed and scales automatically, from a few requests per day to thousands per second. The lambda function 124 makes the notifications available to the intended recipients of the notifications on an as needed basis, via the internet connection 126.

After new data is replicated from the primary database 146 to the secondary database 158, the replicated new data is forwarded via the Network Address Translation (NAT) gateway 132 which is a highly-available managed service that makes it easy to connect to the Internet from instances within a private subnet, such as the second private database subnet 142, in a virtual private cloud, such as the virtual private cloud 130. The NAT gateway 132 forwards the replicated new data via the router 134 to the set of endpoints 136 to the Simple Notification Service (SNS) topic 122 to the lambda function 124, which makes the replicated new data available via the internet connection 126. The router 134 also routes the replicated new data to the internet gateway 120, which makes the replicated new data available directly via the internet connection 126 and indirectly via the internet connection 126 through the lambda function 124.

The first SQL layer 148 pushes events to the orchestration layer 152 to leverage the user-defined functions' capability to act as a medium for the primary database 146. The first SQL layer 148 detects an event upon receiving the incoming request that creates the event, rather than a data-consuming application polling the event at some time after the event occurs. Therefore, the updating of the distributed database system is based on a push model that pushes updates to data-consuming applications, thereby eliminating the time delays which occur when data-consuming applications are based on a pull model that polls for updates. Once the required user-defined functions are executed, the event-based webhook integration enables the distributed database system to send a real-time alert that notifies data consuming applications of the data update.

Figure 2:
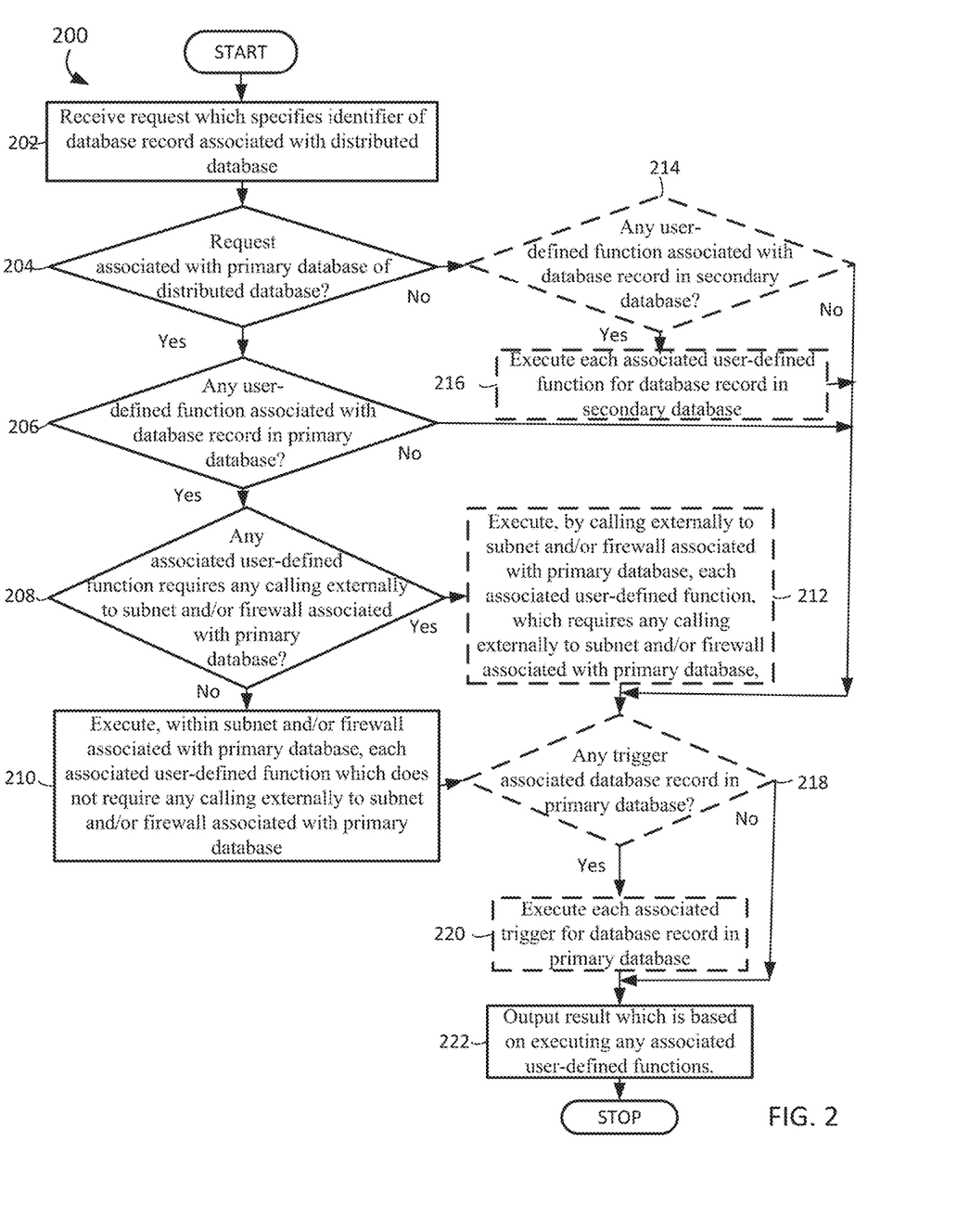
FIG. 2 is an operational flow diagram illustrating a high-level overview of a method for optimizing transaction times in distributed databases, in an embodiment.

FIG. 2 is an operational workflow diagram illustrating a high-level overview of a method 200 for optimizing transaction times in distributed databases. A request is received which specifies an identifier of a database record associated with a distributed database, block 202. The system receives a request that may generate an optimized transaction in a distributed database. For example, and without limitation, this can include the first host machine 144 receiving a request to write new stock share prices, including the new price of $99.99 for each share of Acme Corporation stock. In another example, the first host machine 144 receives a customer's request to view the customer's stock share prices from the laptop computer 102.

After receiving a request that is associated with a distributed database, whether the request is associated with the primary database of the distributed database is determined, block 204. The system determines if an incoming request is to write to a distributed database system's primary database. By way of example and without limitation, this can include the first SQL layer 148 determining that the request to write new stock share prices, including the new price of $99.99 for each share of Acme Corporation stock, is a write request which is to be executed on the distributed database system's primary database 146. If a request is associated with a distributed database system's primary database, the method 200 continues to block 206 to determines if any user-defined function is associated with the primary database record identified by the request. If a request is not associated with a distributed database system's primary database, the method 200 proceeds to block 214 to determine if a user-defined function is associated with the secondary database record identified by a request.

If a request is associated with the primary database of a distributed database, whether any user-defined function is associated with the primary database record identified by the request is determined, block 206. The system determines if any user-defined function is enabled for a primary database record identified by a request. In embodiments, this can include the first SQL layer 148 identifying a user-defined function for comparing new stock share prices, including the new price of Acme Corporation stock shares, to the differing prices of stock shares specified by different customers' buy limit orders and a user-defined function that conditionally purchases stock shares, including Acme Corporation stock shares, if the new price of a stock share is below the prices of the stock share specified by any the customers' buy limit orders. If any user-defined function is associated with a primary database record identified by a request, the method 200 continues to block 208 to determine if executing any associated user-defined function will result in calling externally to the subnet and firewall for the primary database's host machine. If no user-defined function is associated with a primary database record identified by the request, the method 200 proceeds to block 218 to determine if any triggers are associated with the primary database record identified by the request.

If any user-defined function is associated with a primary database record identified by a request, whether any associated user-defined function requires any call that is external to the subnet and/or the firewall associated with the primary database is determined, block 208. The system determines whether each user-defined function to be executed for a primary database record identified by a request will be calling externally to the subnet and firewall for the primary database's host machine. For example, and without limitation, this can include the first SQL layer 148 invoking the first orchestration layer 152 which determines that the user-defined function for comparing the new price of stock shares, including Acme Corporation stock shares, to the differing prices of stock shares specified by different customers' buy limit orders is to be executed within the subnet and firewall for the first host machine 144 that hosts the primary database 146. In another example, the first SQL layer 148 invokes the first orchestration layer 152 which determines that the user-defined function that conditionally purchases stock shares, including Acme Corporation stock shares, if the new price for a stock share is below any of the prices for the stock share specified by any customers' buy limit orders is to be executed by calling externally to the subnet and firewall for the first host machine 144 that hosts the primary database 146. For each associated user-defined function that does not require calling externally to the primary database's subnet and firewall, the method 200 continues to block 210 to internally execute each of these user-defined functions. For each associated user-defined function which requires calling externally to the primary database's subnet and firewall, the method 200 proceeds to block 212 to call externally to execute each of these user-defined functions.

Each associated user-defined function which does not require calling externally to the primary database's subnet and firewall, is executed within the primary database's subnet and firewall, for the database record in the primary database, block 210. The system executes user-defined functions for primary database records within the subnet and firewall for the primary database's host machine. By way of example and without limitation, this can include the first orchestration layer 152 executing the user-defined function which operates within the subnet and firewall for the primary database's host machine and compares the new price of stock shares, including Acme Corporation stock shares, to the prices of stock shares specified by customers' buy limit orders, Then the method 200 continues to block 218 to determine if there are any triggers associated with the primary database record identified by a request.

Each associated user-defined function, which requires any call that is external to the primary database's subnet and firewall, is executed by calling externally to the primary database's subnet and firewall, for the database record in the primary database, block 212. The system can execute each user-defined function for primary database records which are external to the subnet and firewall for the primary database's host machine. In embodiments, this can include the first SQL layer 148 executing the user-defined function which calls externally to the subnet and firewall for the primary database's host machine to a third-party to purchase large amounts of Acme Corporation stock shares because the new price of Acme Corporation stock shares is below many of the prices of Acme Corporation stock shares specified by many customers' buy limit orders.

If a request is not associated with the primary database of a distributed database, whether any user-defined function is associated with the secondary database record identified by a request is optionally determined, block 214. The system can determine if any user-defined function will be executed for a secondary database record identified by a request. For example, and without limitation, this can include the second SQL layer 160 responding to a customer's request to view their stock shares' prices by identifying a user-defined function for reading the new share prices of each stock in a customer's portfolio from the secondary database 158, including the new share prices for Acme Corporation stock. If any user-defined function is associated with the secondary database record identified by a request, the method 200 continues to block 216 to execute any associated user-defined functions for the secondary database. If no user-defined function is associated with the secondary database record identified by a request, the method 200 proceeds to block 218 to determine if any triggers are associated with the primary database record identified by a request.

If any user-defined function is associated with the secondary database record identified by a request, each associated user-defined function for a database record in a secondary database is optionally executed, block 216. The system can execute each user-defined function for secondary database records. By way of example and without limitation, this can the second orchestration layer 164 executing the user-defined function which reads the new share prices of each stock in the customer's portfolio from the secondary database 158, including the new share prices for Acme Corporation stock, and sending the compilation of share prices for each listed stock to the output queue for the second host machine 156. Then the method 200 proceeds to block 218 to determine if any triggers are associated with the primary database record identified by a request.

Along with executing any associated user-defined functions for a database record identified by a request, whether any triggers are associated with a primary database record identified by the request is optionally determined, block 218. The system determines if any triggers are to be executed based on the database record identified by a request. In embodiments, this can include the first SQL layer 148 determining whether any triggers are associated with the primary database record identified by the request. If any triggers are associated with a primary database record identified by a request, the method 200 continues to block 220 to execute the triggers. If no triggers are associated with a primary database record identified by a request, the method 200 proceeds to block 222 to output the results from executing any associated user-defined functions.

If any triggers are associated with a primary database record identified by a request, any triggers for the database record identified by the request are optionally executed in the primary database, block 220. The system can execute any triggers associated with a primary database record identified by a request. For example, and without limitation, this can include the first SQL layer 148 executing a trigger that combines a customer's most recent purchases and sales of stock shares, including the purchase of Acme Corporation stock shares based on the customer's buy limit order, into a notification, and provides the notification to the output queue of the first host machine 144.

Having executed any associated user-defined functions, a result which is based on executing any associated user-defined functions is output, block 222. The result may be also based on executing a trigger. The system outputs the results of executing any optimized transactions for the distributed database. By way of example and without limitation, this can include the first host machine 144 outputting purchase notifications to many customers, notifications which include the purchases of Acme Corporation stock shares corresponding to the customers' buy limit orders.

The method 200 may be repeated as desired. Although this disclosure describes the blocks 202-222 executing in a particular order, the blocks 202-222 may be executed in a different order. In other implementations, each of the blocks 202-222 may also be executed in combination with other blocks and/or some blocks may be divided into a different set of blocks.

System Overview

Figure 3:
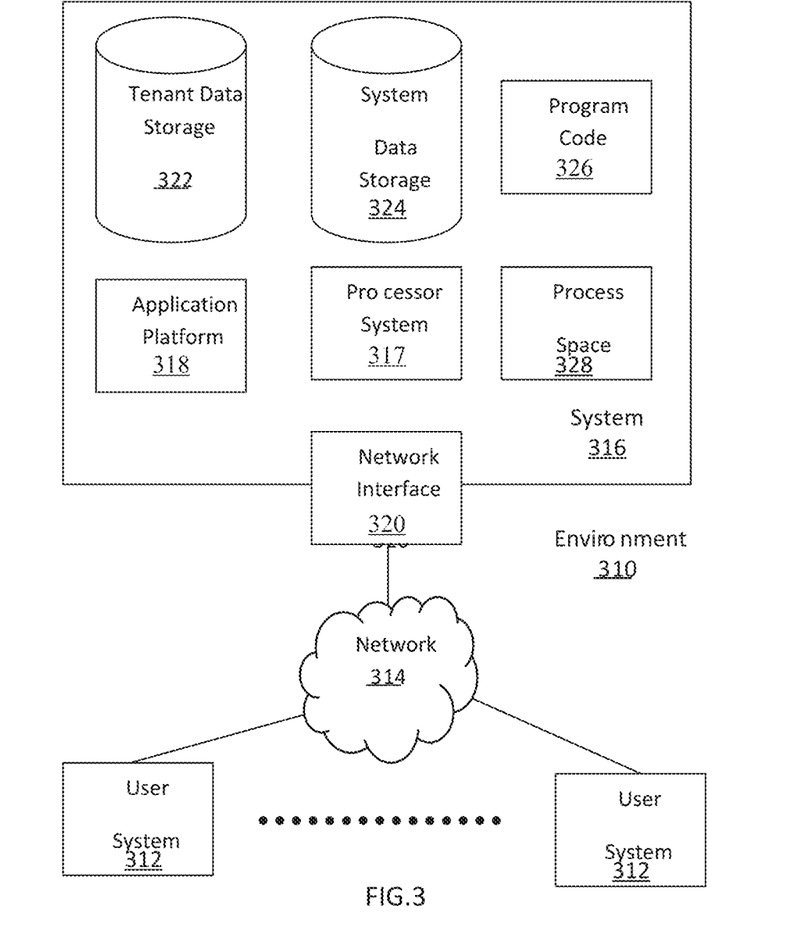
FIG. 3 illustrates a block diagram of an example of an environment wherein an on-demand database service may be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a workstation, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects.

A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312-, or third-party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, the system 316 implements applications other than, or in addition to, a CRM application. For example, the system 316 may provide tenant access to multiple hosted (standard and custom) applications, including a CRM application. User (or third-party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314.

Each of the user systems 312 also typically includes one or more user interface devices, such as a keyboard, a mouse, trackball, touch pad, touch screen, pen, or the like, for interacting with a graphical user interface (GUI) provided by the browser on a display (e.g., a monitor screen, LCD display, etc.) in conjunction with pages, forms, applications, and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nano-systems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data, and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
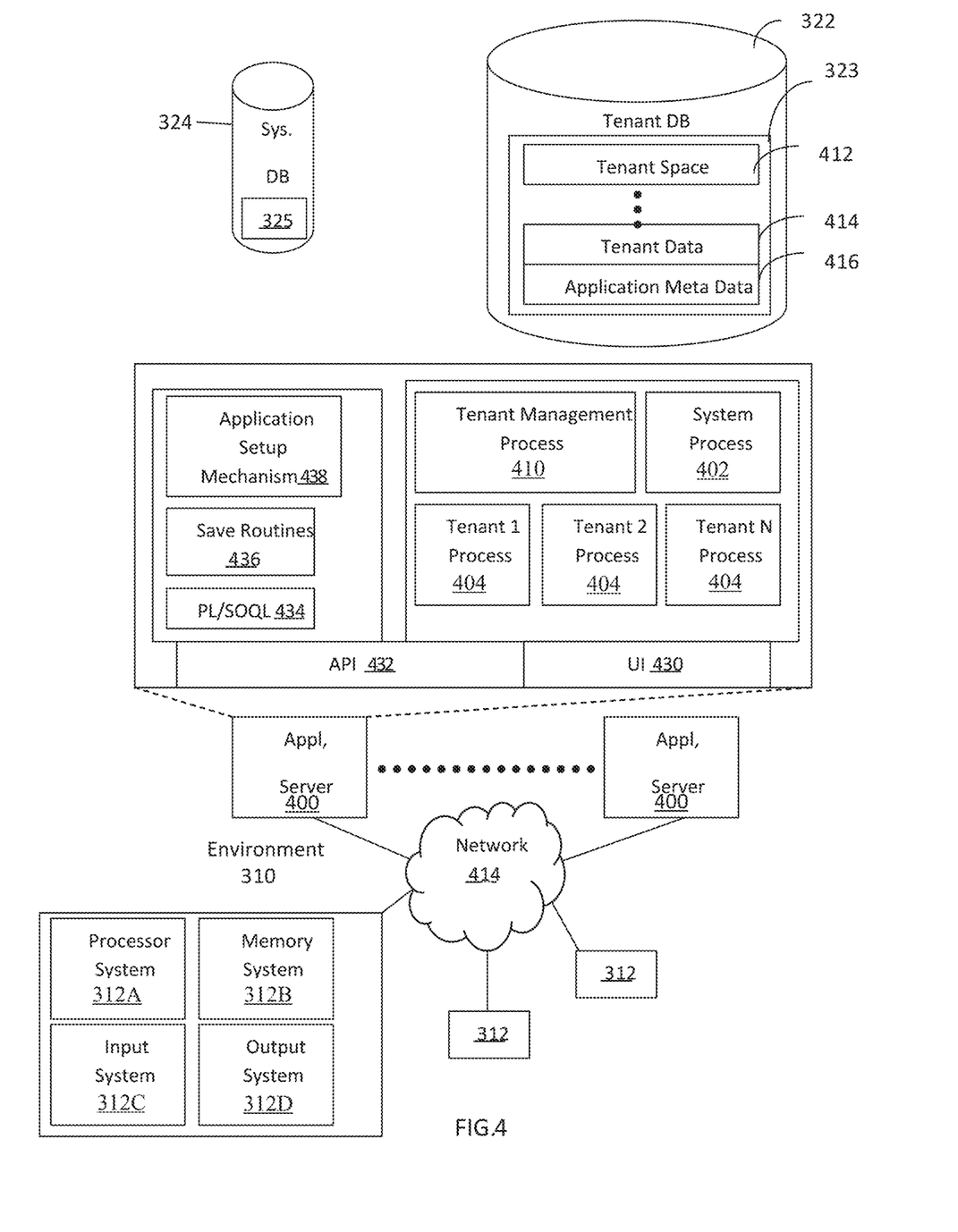
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D.

FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long-term memory. The input system 312C may be any combination of input devices, such as one or more keyboards, mice, trackballs, scanners, cameras, and/or interfaces to networks.

The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410.

Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414.

Similarly, a copy of MRU items for an entire organization that is a tenant might be stored to the tenant storage area 412. The UI 430 provides a user interface, and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400.

Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals, and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate.

Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein.

Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for optimizing transaction times in distributed databases, the system comprising:
   one or more processors; and
   a non-transitory computer readable medium storing a plurality of instructions, which when executed, cause the one or more processors to:
   determine, in response to receiving a request specifying an identifier of a database record associated with a distributed database, whether the request is associated with a primary database of the distributed database;
   determine, in response to a determination that the request is associated with the primary database of the distributed database, whether any user-defined function is associated with the database record in the primary database;

determine, in response to a determination that any user-defined function is associated with the database record in the primary database, whether any associated user-defined function requires any call that is external to at least one of a subnet or a firewall associated with the primary database;

execute, within at least one of the subnet or the firewall associated with the primary database, an associated user-defined function that is determined to not require any call, for the database record in the primary database, that is external to at least one of the subnet or the firewall associated with the primary database; and cause to be outputted, a result that is based on executing any associated user-defined functions.

2. The system of claim 1, wherein an associated user-defined function of each associated user-defined function at least one of resides on a same host machine as the primary database, resides on an other host machine in a same subnet as the primary database, and is executed by a virtual machine that resides on the same host machine as the primary database.

3. The system of claim 1, comprising further instructions, which when executed, cause the one or more processors to execute, by calling externally to at least one of the subnet and the firewall associated with the primary database, each associated user-defined function, which is determined to require any call that is external to at least one of the subnet and the firewall associated with the primary database, for the database record in the primary database.

4. The system of claim 3, wherein calling externally comprises calling a third-party application and receiving a corresponding result from calling the third-party application.

5. The system of claim 1, comprising further instructions, which when executed, cause the one or more processors to:
determine whether a trigger is associated with the database record in the primary database; and
execute the trigger for the database record in the primary database, in response to a determination that the trigger is associated with the database record in the primary database, wherein the result which is based on executing any associated user-defined functions is further based on executing the trigger.

6. The system of claim 1, comprising further instructions, which when executed, cause the one or more processors to:
determine whether any user-defined function is associated with the database record in a secondary database of the distributed database, in response to a determination that the request is not associated with the primary database of the distributed database; and
execute any associated user-defined function for the database record in the secondary database, in response to a determination that any user-defined function is associated with the database record in a secondary database of the distributed database.

7. The system of claim 6, wherein executing any associated user-defined function for the database record in the secondary database comprises one of executing within at least one of the subnet and the firewall associated with the secondary database and executing by calling externally to at least one of the subnet and the firewall associated with the secondary database.

8. A computer program product comprising computer-readable program code to be executed by one or more processors when retrieved from a non-transitory computer-readable medium, the program code including instructions to:

determine, in response to receiving a request specifying an identifier of a database record associated with a distributed database, whether the request is associated with a primary database of the distributed database;

determine, in response to a determination that the request is associated with the primary database of the distributed database, whether any user-defined function is associated with the database record in the primary database;

determine, in response to a determination that any user-defined function is associated with the database record in the primary database, whether any associated user-defined function requires any call that is external to at least one of a subnet or a firewall associated with the primary database;

execute, within at least one of the subnet or the firewall associated with the primary database, an associated user-defined function that is determined to not require any call, for the database record in the primary database, that is external to at least one of the subnet or the firewall associated with the primary database; and cause to be outputted, a result that is based on executing any associated user-defined functions.

9. The computer program product of claim 8, wherein an associated user-defined function of each associated user-defined function at least one of resides on a same host machine as the primary database, resides on an other host machine in a same subnet as the primary database, and is executed by a virtual machine that resides on the same host machine as the primary database.

10. The computer program product of claim 8, wherein the program code includes further instructions to execute, by calling externally to at least one of the subnet and the firewall associated with the primary database, each associated user-defined function, which is determined to require any call that is external to at least one of the subnet and the firewall associated with the primary database, for the database record in the primary database.

11. The computer program product of claim 10, wherein calling externally comprises calling a third-party application and receiving a corresponding result from calling the third-party application.

12. The computer program product of claim 8, wherein the program code includes further instructions to:
determine whether a trigger is associated with the database record in the primary database; and
execute the trigger for the database record in the primary database, in response to a determination that the trigger is associated with the database record in the primary database, wherein the result which is based on executing any associated user-defined functions is further based on executing the trigger.

13. The computer program product of claim 8, wherein the program code includes further instructions to:
determine whether any user-defined function is associated with the database record in a secondary database of the distributed database, in response to a determination that the request is not associated with the primary database of the distributed database; and
execute any associated user-defined function for the database record in the secondary database, in response to a determination that any user-defined function is associated with the database record in a secondary database of the distributed database.

14. The computer program product of claim 13, wherein executing any associated user-defined function for the database record in the secondary database comprises one of executing within at least one of the subnet and the firewall associated with the secondary database and executing by calling externally to at least one of the subnet and the firewall associated with the secondary database.

15. A computer-implemented method for optimizing transaction times in distributed databases, the computer-implemented method comprising:

determining, in response to receiving a request specifying an identifier of a database record associated with a distributed database, whether the request is associated with a primary database of the distributed database;

determining, in response to a determination that the request is associated with the primary database of the distributed database, whether any user-defined function is associated with the database record in the primary database;

determining, in response to a determination that any user-defined function is associated with the database record in the primary database, whether any associated user-defined function requires any call that is external to at least one of a subnet or a firewall associated with the primary database;

executing, within at least one of the subnet or the firewall associated with the primary database, an associated user-defined function that is determined to not require any call, for the database record in the primary database, that is external to at least one of the subnet or the firewall associated with the primary database; and     causing to be outputted, a result that is based on executing any associated user-defined functions.

16. The computer-implemented method of claim 15, wherein an associated user-defined function of each associated user-defined function at least one of resides on a same host machine as the primary database, resides on an other host machine in a same subnet as the primary database, and is executed by a virtual machine that resides on the same host machine as the primary database.

17. The computer-implemented method of claim 15, wherein the computer-implemented method further comprises executing, by calling externally to at least one of the subnet and the firewall associated with the primary database, each associated user-defined function, which is determined to require any call that is external to at least one of the subnet and the firewall associated with the primary database, for the database record in the primary database, wherein calling externally comprises calling a third-party application and receiving a corresponding result from calling the third-party application.

18. The computer-implemented method of claim 15, wherein the computer-implemented method further comprises:

determining whether a trigger is associated with the database record in the primary database; and     executing the trigger for the database record in the primary database, in response to a determination that the trigger is associated with the database record in the primary database, wherein the result which is based on executing any associated user-defined functions is further based on executing the trigger.

19. The computer-implemented method of claim 15, wherein the computer-implemented method further comprises     determining whether any user-defined function is associated with the database record in a secondary database of the distributed database, in response to a determination that the request is not associated with the primary database of the distributed database; and     executing any associated user-defined function for the database record in the secondary database, in response to a determination that any user-defined function is associated with the database record in a secondary database of the distributed database.

20. The computer-implemented method of claim 19, wherein executing any associated user-defined function for the database record in the secondary database comprises one of executing within at least one of the subnet and the firewall associated with the secondary database and executing by calling externally to at least one of the subnet and the firewall associated with the secondary database.

\* \* \* \* \*